United States Patent

Higuchi et al.

[11] Patent Number: 6,065,111
[45] Date of Patent: May 16, 2000

[54] PROCESSOR WITH A PROCESSOR-ACCESSIBLE CACHE FOR DATA RECEIVED FROM OUTSIDE OF THE PROCESSOR

[75] Inventors: Tatsuo Higuchi, Fuchu; Naoki Hamanaka, Tokyo, both of Japan

[73] Assignee: Hitachi, Ltd., Tokyo, Japan

[21] Appl. No.: 08/120,911

[22] Filed: Sep. 15, 1993

[30] Foreign Application Priority Data

Sep. 18, 1992 [JP] Japan .................................. 4-249193

[51] Int. Cl.[7] ...................................................... G06F 7/38
[52] U.S. Cl. ........................................ 712/220; 711/113
[58] Field of Search ..................... 395/425, 395; 712/220; 711/113

[56] References Cited

U.S. PATENT DOCUMENTS

| | | | |
|---|---|---|---|
| 4,713,755 | 12/1987 | Worley, Jr. et al. | 395/375 |
| 4,942,518 | 7/1990 | Weatherford et al. | 395/800 |
| 5,155,832 | 10/1992 | Hunt | 395/425 |
| 5,247,648 | 9/1993 | Watkins et al. | 395/425 |
| 5,249,282 | 9/1993 | Segers | 395/425 |
| 5,251,310 | 10/1993 | Smelser et al. | 395/425 |

FOREIGN PATENT DOCUMENTS

| | | |
|---|---|---|
| 0278196 | 8/1988 | European Pat. Off. . |
| 0375864 | 7/1990 | European Pat. Off. . |
| 3-150659 | 6/1991 | Japan . |
| 3-168860 | 7/1991 | Japan . |

OTHER PUBLICATIONS

Electronic Information Communiations Society, Collection of Papers, D–1, vol. J75–D–1, No. 8, pp. 637–645, 1992.

Primary Examiner—Zarni Maung
Attorney, Agent, or Firm—Beall Law Offices

[57] ABSTRACT

A processor for a multiprocessor system, such as a parallel processor system, connected to a network has a sending unit and a receiving unit for transferring and receiving data to and from the network as well as a receive cache and a main cache. When data is received from the network, it is determined whether a hit or miss occurs to the main cache and receive cache, respectively. If a hit to the receive cache occurs, then the receive cache controller stores the data directly in the receive cache as it is received. When a hit to the main cache occurs, an intercache transfer is executed for transferring the hit block in the main cache to the receive cache so that the data can be stored in the receive cache. When an instruction processor requests access to data held in the receive cache, the data is retrieved to the instruction processor and at the same time transferred to a main cache.

35 Claims, 11 Drawing Sheets

PROCESSOR WITH A PROCESSOR-ACCESSIBLE CACHE FOR DATA RECEIVED FROM OUTSIDE OF THE PROCESSOR

FIELD OF THE INVENTION

The present invention relates to a processor with cache memory used in a multiprocessor system and in particular to a processor using receive cache memory for receiving data from other processors in such a system.

BACKGROUND OF THE INVENTION

In a parallel processor system having a plurality of processor elements (PE) each having a processor and a local memory, it is known that access to the local memory by the processor is speeded up by providing a cache memory for the local memory of each PE. Examples of such systems are disclosed in Japanese Patent Laid-Open Nos. 150659/1992 and 168860/1992. These known examples use cache memory not only for speeding up the access to the local memory by the processor, but also for increasing the operation speed when transferring data in the local memory to other PEs. That is, when data in local memory is to be sent to other PEs and that data is held in the cache memory, the PE on the sending side requests the data from the cache memory and sends it on the network.

In Japanese Patent Laid-Open No. 150659/1992, there is no description about the processing of received data. In Denshi Joho Tsushin Gakkai Ronbunshi (Electronic Information Communications Society, Collection of Papers) D-1 Vol. J75-D-1 No. 8, 637–645 (hereinafter referred to simply as the Denshi Paper), it is disclosed that the received data is written into local memory although the disclosure about the processing of data to be sent to a destination cluster is the same as that disclosed in Japanese Patent Laid-Open No. 150659/1992. In Japanese Patent Laid-Open No. 168860/1992, when external data is received and is to be written into local memory, it is first checked whether the cache memory retains previous data. If the previous data is contained in the cache memory, it is also written over with the received data in order to make the received data available for the processor from the cache memory. When the cache memory does not contain any previous data, the received data is written into the local memory.

In Japanese Patent Laid-Open No. 150659/1992, when data is to be sent to a destination cluster, the data present in the cache memory of the processor is directly put on the network. However, no specific disclosure mentions speeding up the receive processing. In the Denshi Paper, the received data is stored in local memory and, when the processor references the data, it reads it from the local memory. Since the received data is always referenced by the processor, the overhead for data reference will very likely degrade the performance of the parallel processor system.

In Japanese Patent Laid-Open No. 168860/1992, on the other hand, since the data to be sent is referenced from the local memory, the data sending overhead necessarily increases. As to the receiving process, when the cache memory of the processor contains data to be written over with the received data, the cache memory is updated to keep the overhead for data reference by the processor small.

However, when the data in the cache memory to be written over is replaced with other data so that the data to be updated is not contained in the cache memory, the received data is written into local memory (once). The processor then references the data in the local memory. Since a generally used algorithm for replacing the cache memory is a least recently used (LRU) algorithm, there is an increased chance of cache replacement occurring. This in turn results in an increased overhead for received data reference, deteriorating the performance of the parallel processor system.

SUMMARY OF THE INVENTION

The object of the present invention is to provide a processor for a multiprocesor system in which the processor can use data received from other processor elements (PEs) with high speed.

The invention is applicable to a multiprocessor processor system, such as a parallel processor system, which has a plurality of clusters, each comprising a cache memory, one or more independently operable processors with a local memory shared by the one or more processors, and a network interconnecting the plurality of clusters. The objectives of this invention are accomplished by providing a buffer memory for sending data, which is preferably a first-in first-out (FIFO) buffer separate from the cache memory and a dedicated receive cache memory for receiving processing. When data is to be sent that is stored in the cache memory, it is transferred directly to the sending buffer memory and sent out on the network. When data is to be received from the network, it is stored into the receive cache memory and then read out from the receive cache memory when the processor references the data.

With a multiprocessor system using the processor or processor element of this invention, since a buffer memory is used for storing data to be sent, preferably a FIFO buffer, and since a receive cache is used for receiving data, it is possible for the processor to reference data directly from the processor's cache memory when data is to be sent out; and when data is to be received, the received data can be directly stored in the receive cache. Thus, when the received data is to be referenced, the processor accesses the receive cache to retrieve the data without accessing the local memory, thereby reducing the data referencing overhead and enabling high-speed interprocessor communication within the system.

DETAILED DESCRIPTION OF THE PREFERRED EMBODIMENTS

Figure 1:
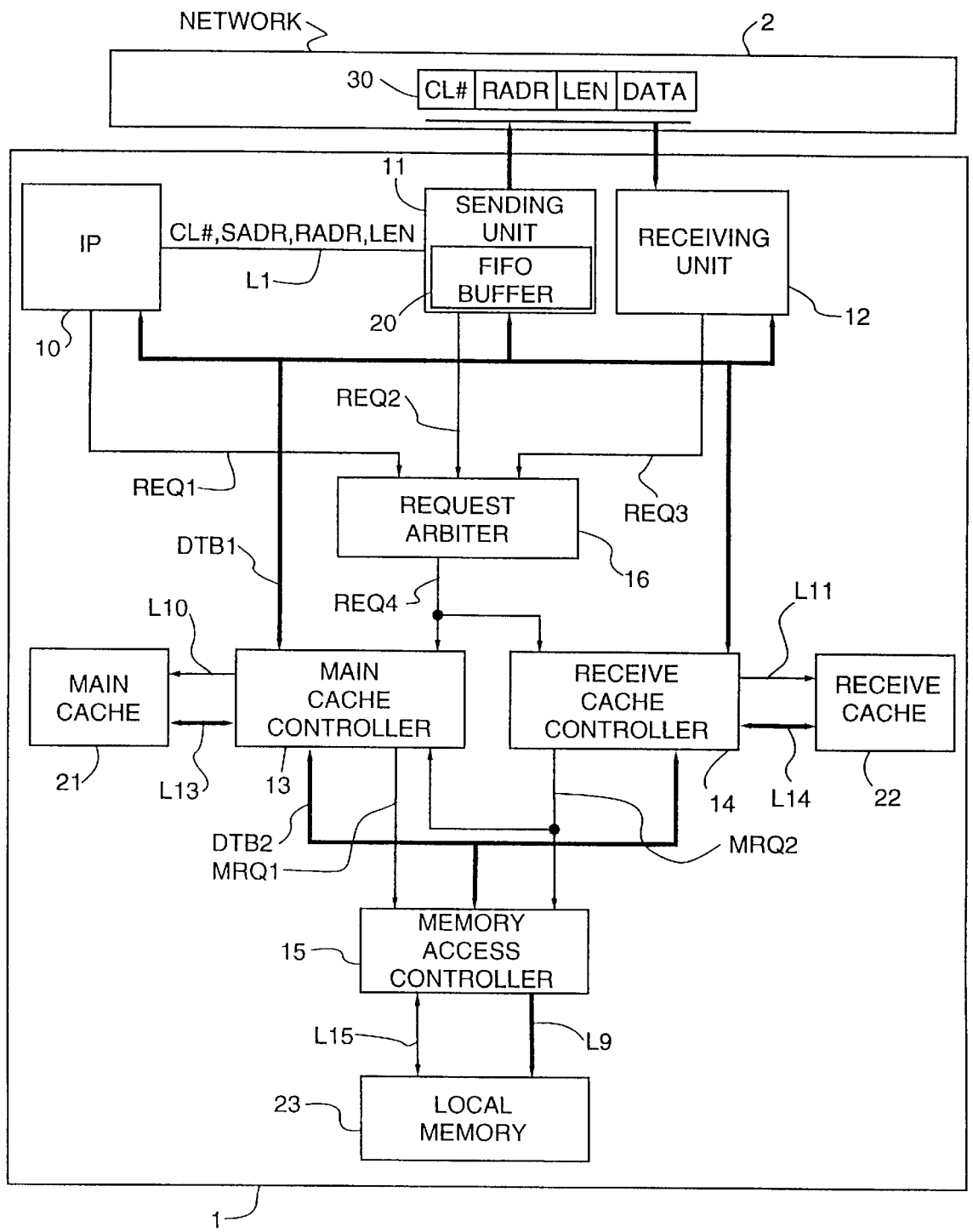
FIG. 1 is a block diagram showing the configuration of a processor or processor element in a multiprocessor system as one embodiment of the invention.

FIG. 1 shows the configuration of a multiprocessor system, such as a parallel processor system, having a processor, processor element or cluster according to one embodiment of the invention. In such a system many clusters would be used, although FIG. 1 shows only one cluster 1 for simplicity. A network 2 would interconnect the clusters and transfer packets from one cluster to another.

Each cluster includes the following elements. An instruction processor 10 (hereinafter referred to as an IP) executes integer calculations and floating point calculations. A sending unit 11 sends a packet including sending data instructed by the IP 10 onto the network 2 by fetching and transferring the data to a sending buffer memory, which is preferably a FIFO (first-in first-out) buffer 20 to temporarily store the data before it is sent. Receiving unit 12 receives data packets from the network, and the received data of the packets is stored in a receive cache memory 22. A local memory 23 stores data and instructions used by IP 10 for performing calculations. A main cache 21 temporarily stores data and instructions of the local memory 23. Local memory 23 is accessed through a memory access controller 15. Preferably, main cache 21 is a direct mapped store-in cache, whereas receive cache 22 can be either a direct mapped cache or a cache of the associative type using a LRU replacement algorithm.

A request arbiter 16 directs the flow of data to the main cache controller 13, which controls the main cache 21, and a receive cache controller 14, which controls receive cache 22. Specifically, request arbiter 16 transfers a selected memory access request made by one of the IP 10, the sending unit 11 and the receiving unit 12 to the main cache controller 13 and the receive cache controller 14. The request arbiter 16 also manages the use of bus DTB1 by the IP 10, the sending unit 11 and the receiving unit 12.

The following operations are executed by the cluster: (1) data received by the receiving unit 12 is held in the receive cache 22; (2) when data accessed by the IP 10 exists in the receive cache 22, the accessed data is returned to the IP 10 and at the same time transferred to the main cache 21; and (3) when data requested to be sent by IP 10 exists in the main cache 21, the data is read into the sending FIFO buffer 20 in the sending unit 11 for sending.

Figure 2:
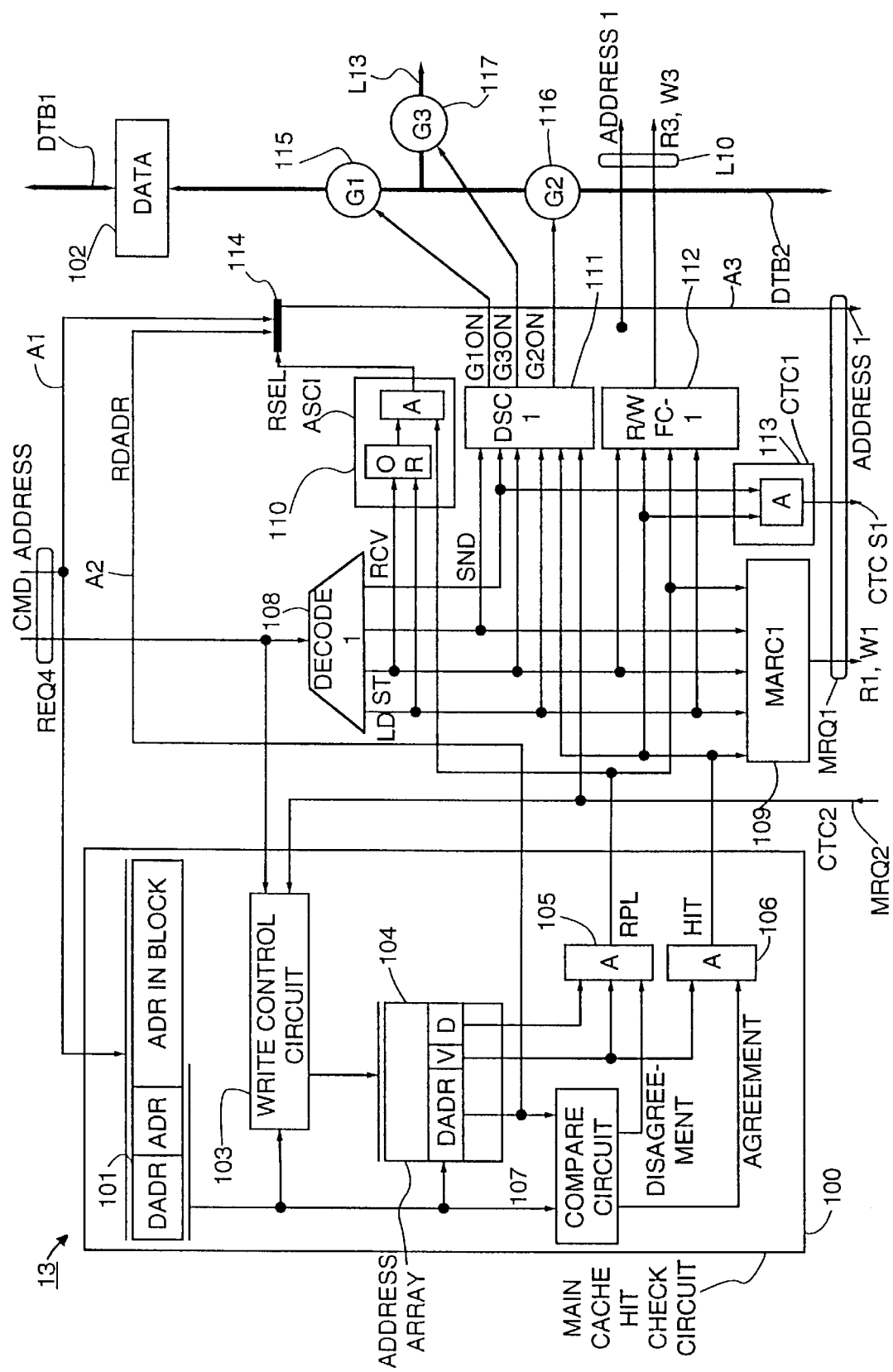
FIG. 2 is a block diagram showing the configuration of a main cache controller in the embodiment.
Figure 5:
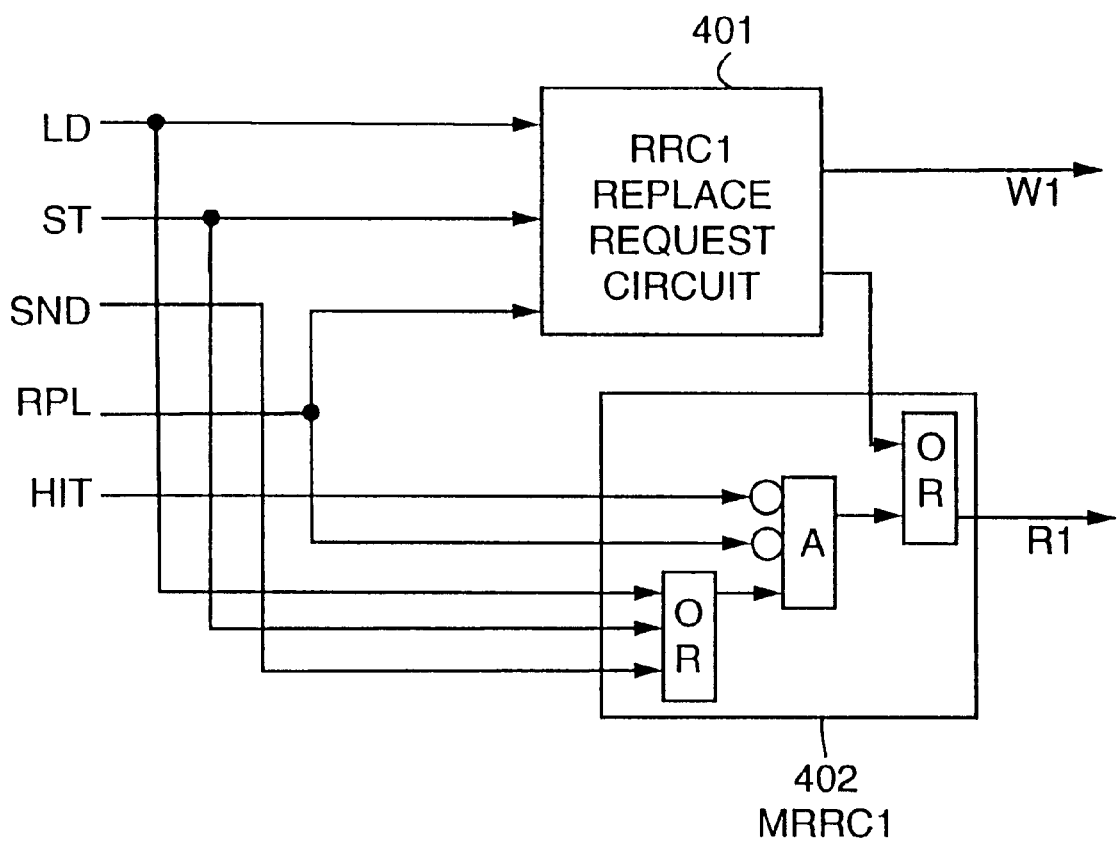
FIG. 5 is a block diagram showing the configuration of a memory access request circuit MARC1 in the embodiment.
Figure 6:
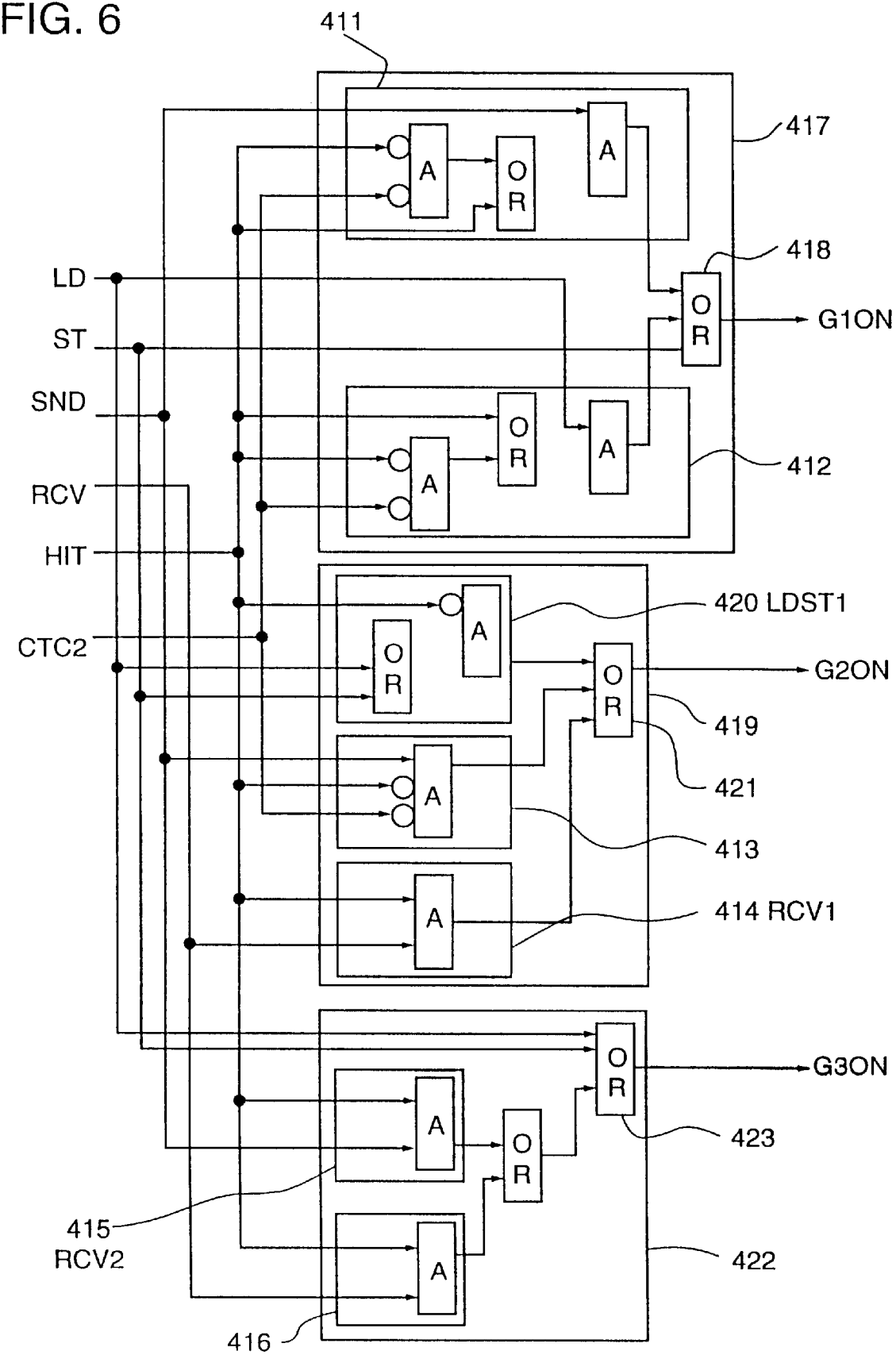
FIG. 6 is a block diagram showing the configuration of a data selection circuit DSC1 in the embodiment.
Figure 7:
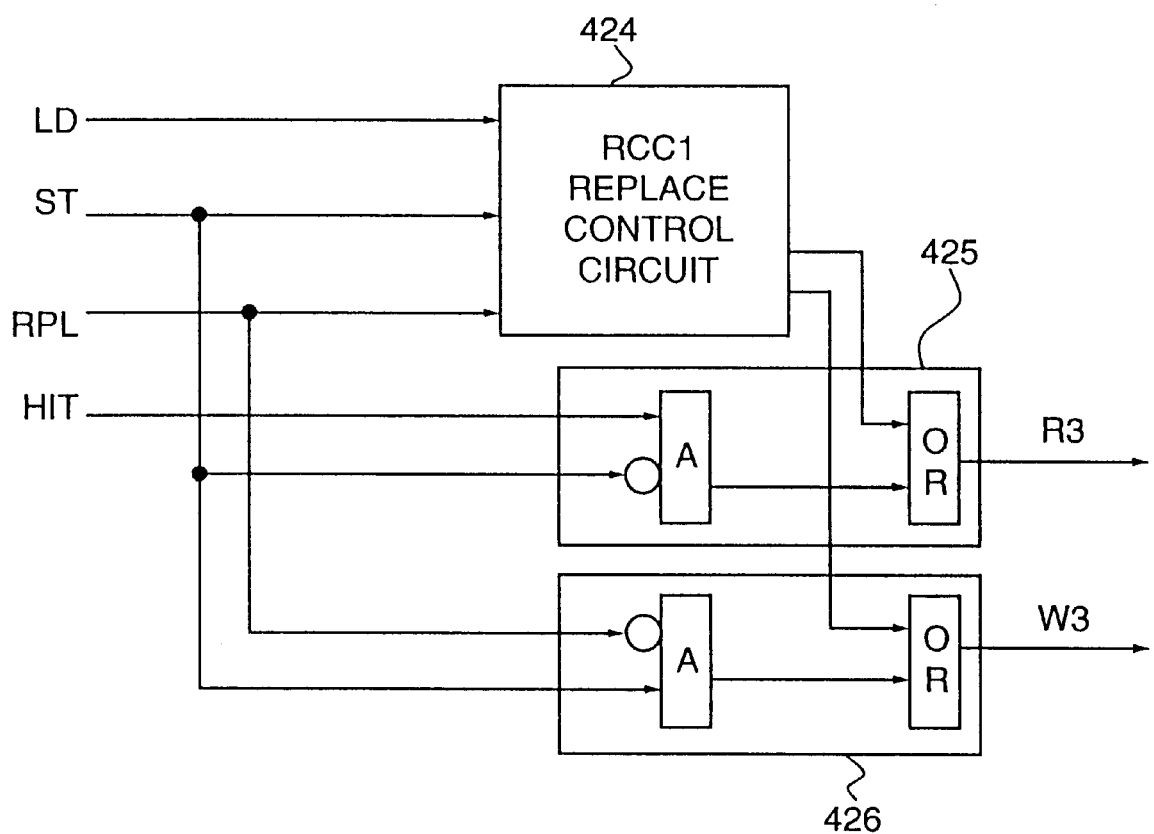
FIG. 7 is a block diagram showing the configuration of a R/W flag circuit R/WFC1 in the embodiment.

FIG. 2 shows the configuration of the main cache controller 13. A main cache hit check circuit 100 examines whether data specified by the Address of REQ4 exists in the main cache 21 and also checks for replacing. A decoder 108 (Decode 1) decodes the CMD of REQ4. A memory access request circuit 109 (MARC1) generates a read request signal R1 for reading a block from the local memory and a write request signal W1 for writing a replace block into the local memory. The detailed configuration is shown in FIG. 5. A selector 114 chooses, according to the control by an address selection circuit 110 (ASC 1), either A1 on which the Address of REQ4 is output or A2 on which the replace address is output, and outputs the selected one to A3. Normally, A1 is selected. A data selection circuit 111 (DSC 1) controls a gate G1 115, a gate G2 116, and a gate G3 117. The detailed configuration is shown in FIG. 6. A R/W flag circuit 112 (R/WFC 1) generates a read signal R3 and a write signal W3 for the main cache 21. The detailed configuration is shown in FIG. 7. A CTC (inter-cache transfer control) generation circuit 113 (CTC1) generates an intercache transfer request signal CTC S1 for transfer from the main cache 21 to the receive cache 22.

Figure 3:
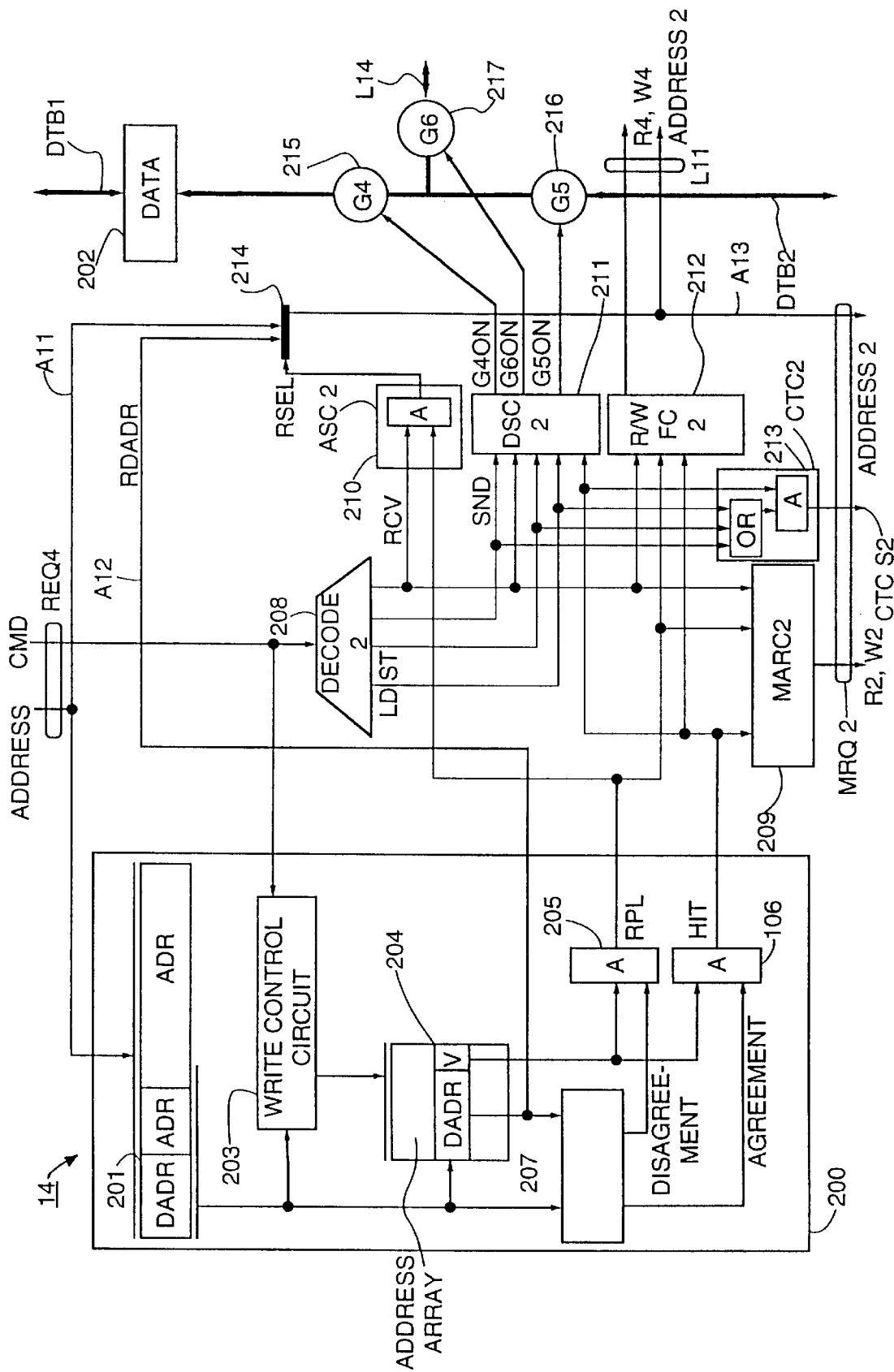
FIG. 3 is a block diagram showing the configuration of a receive cache controller in the embodiment.
Figure 8:
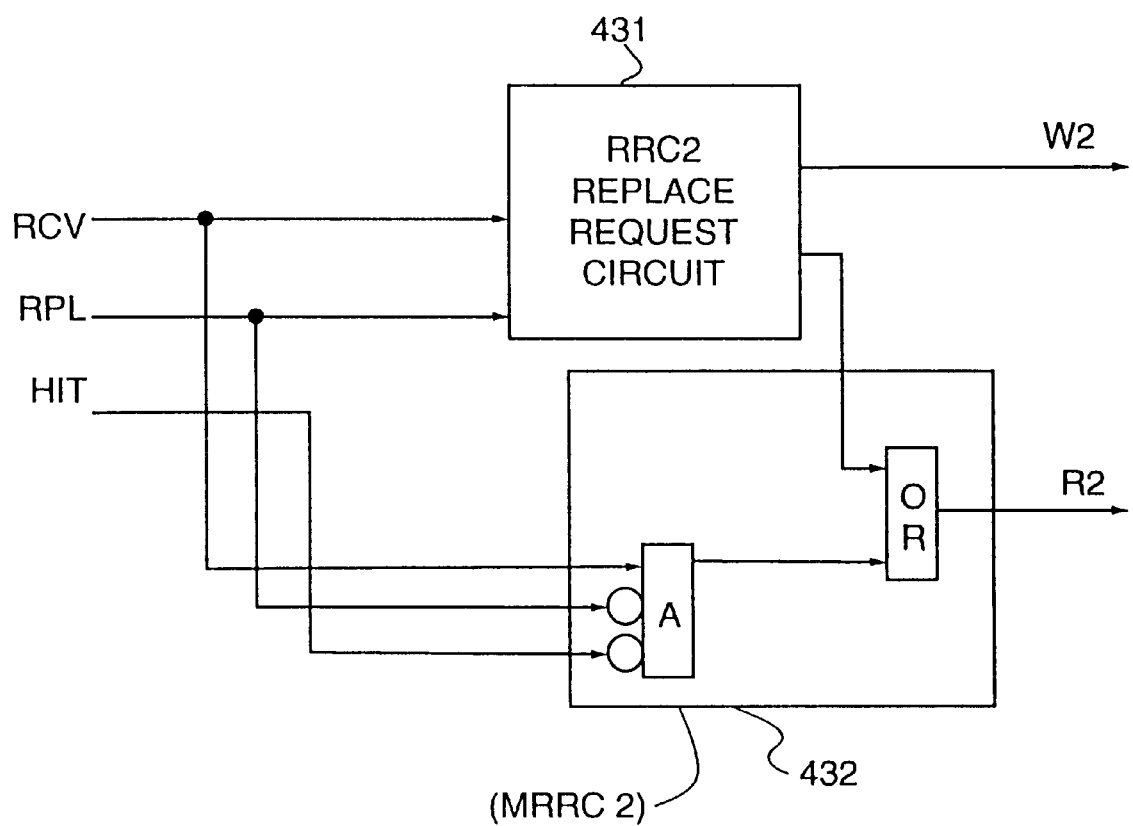
FIG. 8 is a block diagram showing the configuration of a memory access request circuit MARC2 in the embodiment.
Figure 9:
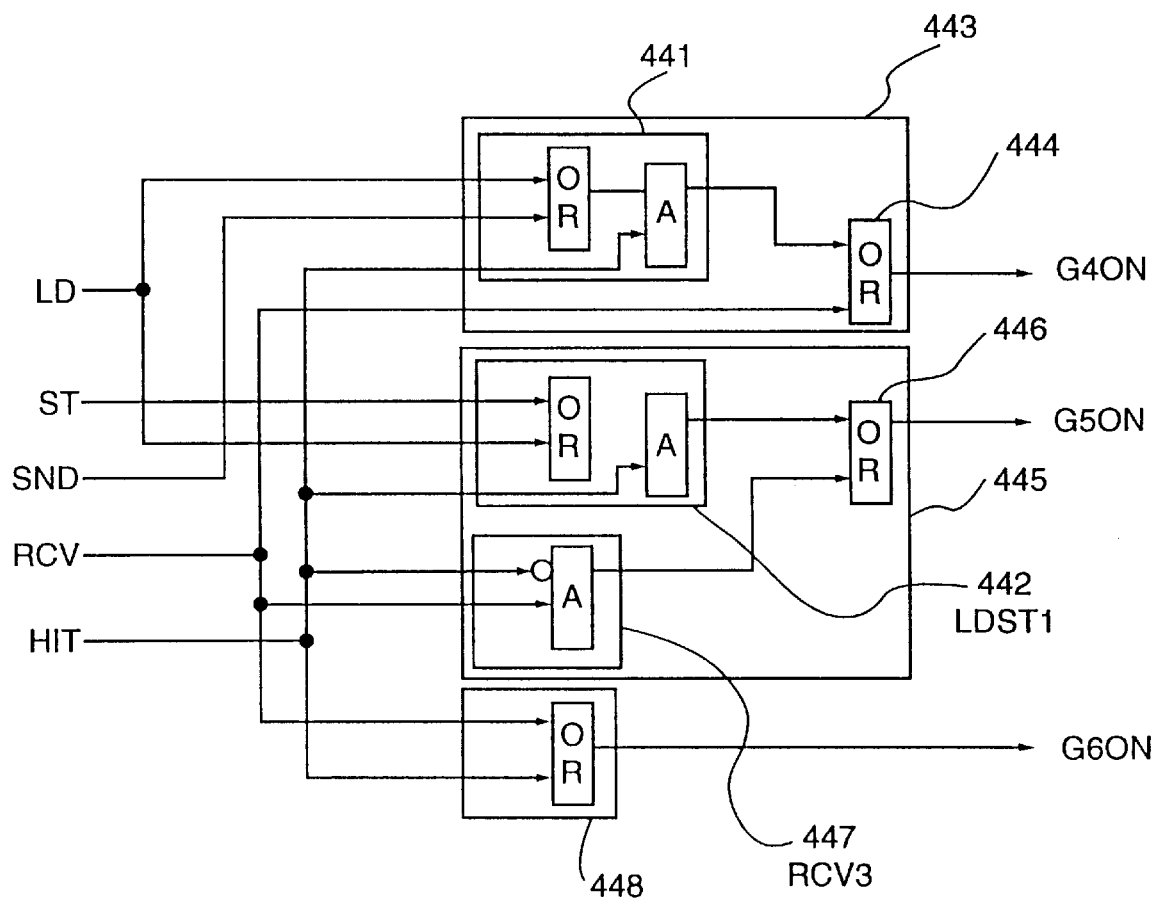
FIG. 9 is a block diagram showing the configuration of a data selection circuit DSC2 in the embodiment.
Figure 10:
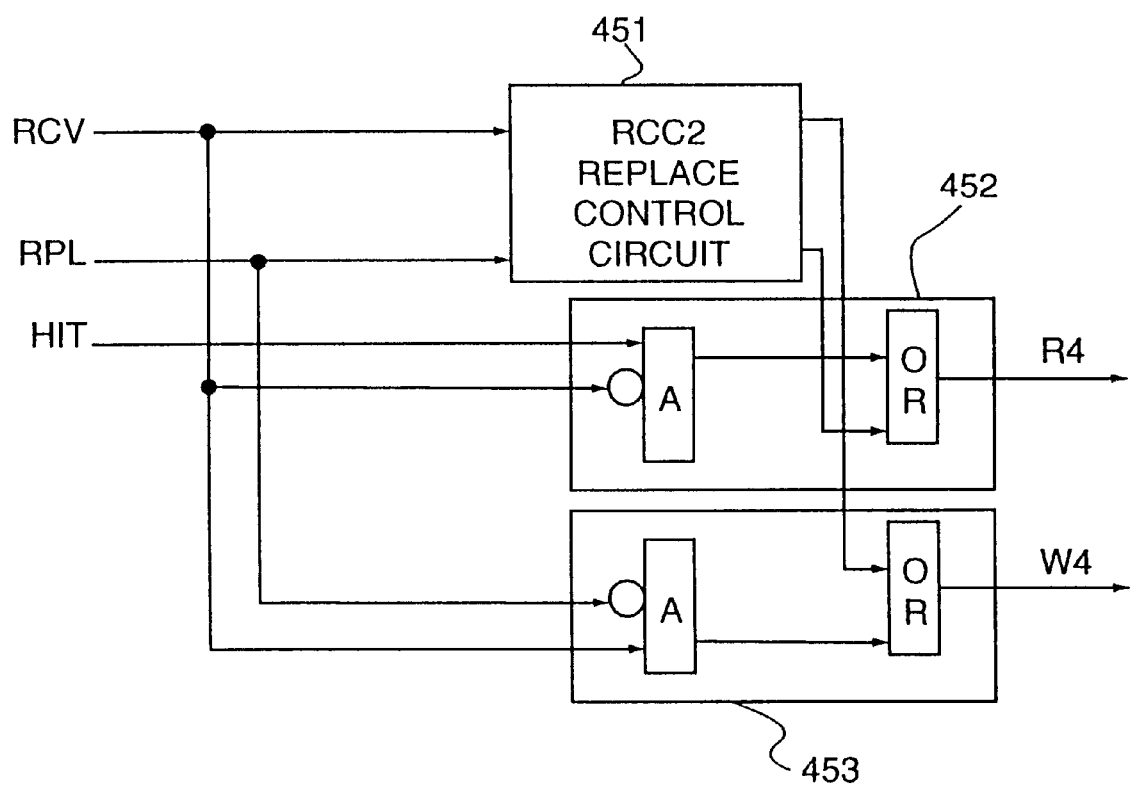
FIG. 10 is a block diagram showing the configuration of a R/W flag circuit R/WFC2 in the embodiment.

FIG. 3 shows the configuration of the receive cache controller 14. A receive cache hit check circuit 200 examines whether data specified by the Address of REQ4 exists in the receive cache and also checks for replacing. A decoder 208 (Decode 2) decodes the CMD of REQ4. A memory access request circuit 209 (MARC 2) generates a read request signal R2 as part of output L10 for reading a block from the local memory and a write request signal W2 for writing a replace block into the local memory. The detailed configuration is shown in FIG. 8. A selector 214 selects, according to the control by an address selection circuit 210 (ASC2), either A11 on which the Address of REQ4 is output or A12 on which the replace address is output, and outputs the selected one to A13. Normally, A11 is selected. A data selection circuit 211 (DSC2) controls a gate G4 215, a gate G5 216 and a gate G6 217. The detailed configuration is shown in FIG. 9. A R/W flag circuit 212 (R/WFC2) generates a read signal R4 and a write signal W4 as part of the output L11 for the receive cache 22. The detailed configuration is shown in FIG. 10. A CTC generation circuit 213 (CTC2) generates an intercache transfer request signal CTC S2 for transfer from the receive cache 22 to the main cache 21 as part of MRQ2.

Further explanation of the hit check circuit operation is made with reference to FIGS. 2 and 3, which show hit check circuits 100 and 200, respectively. In FIG. 2 (or FIG. 3), a register 101 (or 201) holds the memory address Address contained in the memory access request REQ4. An address array 104 (or 204) is associated with the main cache 21 (or receive cache 22) which has a plurality of entries corresponding to the entries in the main cache 21 (or receive cache 22). For the block data held in any entry of the main cache 21 (or 22), the address array 104 (or 204) holds the most significant bit portion (directory address DADR) of the memory address of the block in an entry specified by a series address portion of the memory address (series ADR)—which consists of intermediate bits of the block's memory address—and also has a dirty bit D and a valid bit V for this entry. The dirty bit indicates whether the block has been modified after it has been read out from the main (local) memory to the cache memory. A write control circuit 103 (or 203) is provided for address array 104 (or 204). When the memory address contained in the memory access request REQ4 is taken into the register 101 (or 201), the write control circuit 103 (or 203) reads the directory address DADR from an entry specified by the series address portion (series ADR) of the memory address and also the valid bit V. The directory address DADR thus read out is compared with a directory address held in the register 101 (or 201) by a compare circuit 101 (or 207) to decide whether a block, which includes the data specified by the address in the register 101 (or 201), exists in the main cache 21 (or receive cache 22) and output a signal HIT from an AND gate 106 (or 206) indicating whether the address has hit or not. When the address fails to hit and both the dirty bit D and the valid bit V are "1", a signal RPL is output from an AND gate 105 (or 205) indicating that one of the blocks in the main cache 21 (or receive cache 22) needs to be written back to the local memory (called a replace operation).

The operation and details of the elements of the cluster of this embodiment are as follows.

1. Writing the received data into the receive cache by the receiving unit:

Data on the network is transmitted in packets 30 and received by a particular cluster as identified by the cluster number, CL#. The receive address RADR and length LEN are used by the receiving unit 12 to process the receiving of the data DATA (beginning with the first data of the DATA) in the packet by repeating the following processing until LEN=0.

(1) CMD=RCV and Address=RADR are output to REQ3 and the first data from DATA is output to DTB1.

(2) LEN=LEN−1 and RADR=RADR+1 are set and the next data of the DATA (advanced by one) is output on DTB1.

For each step of the above processing, the request arbiter 16 selects REQ3, which requests memory access for the data received by the receiving unit, and outputs the REQ3 signal to REQ4. In response, the receive cache controller 14 and the main cache controller 13 perform the hit check for the "Address" of REQ4. The receive cache controller 14 latches the data, which was output onto DTB1.

Hit checks in the receive cache controller 14 and the main cache controller 13 are carried out by the hit check circuits 100 (FIG. 2) and 200 (FIG. 3) respectively. In FIGS. 2 and 3, registers 101 and 201 are for holding the memory address "Address" contained in the memory access request REQ4; and address arrays 104 and 204 are for the main cache 21 and the receive cache 22.

1.1 Receive cache: when a miss occurs to the receive cache and the main cache.

When a miss occurs to the receive cache 22 (and to the main cache 21), the receive cache controller 14 performs the following processing to transfer the miss block from the local memory 23 into the receive cache 22. The memory access request circuit 209 generates the memory read request signal R2 by the memory read request circuit 432 (MRRC2 of FIG. 8). The address selection circuit 210 (ASC2) controls the selector 214 to output the Address of the received data of A11 onto A13.

In the R/W flag circuit 212, the receive cache write request circuit 453 (FIG. 10) enables the write signal W4 to write data of the block to the receive cache.

The data selection circuit 211 controls G4, G5 and G6 as follows to write the block transferred and the received data. That is, to secure the path for writing the received data, the RCV signal output from the decoder 208 is supplied to an OR circuit 444 (FIG. 9) to cause a G4 control circuit 443 (FIG. 9) to enable G4ON and also to an OR circuit of G6 control circuit (448 of FIG. 9) to enable G6ON. Then a path to write the block read from the local memory into the receive cache is secured. That is, since the receive cache fails to hit the target data, the output of the RCV3 block transfer control circuit 447 (FIG. 9) is fed to an OR circuit 446 (FIG. 9) to cause a G5 control circuit 445 (FIG. 9) to enable G5ON. This permits the block of data in local memory 23 to be written to receive cache 22. The transfer of this block of data to the receive cache is discussed further with respect to the main cache in the section "Main cache: when a miss occurs to the receive cache and the main cache".

1.1.1 Main cache: when it hits.

When the main cache 21 hits, it performs the intercache transfer from the main cache 21 to the receive cache 22. This is done for the following reason. Generally, received data often have consecutive addresses, e.g. the first through last (LEN=0) data of the DATA in a packet 30, and thus the next received data can be expected to be written into the same block as the previous received data. However, if this block is left held in the main cache, which is a direct mapped cache, there is a possibility of the block being moved to the local memory by a memory access request from IP 10. This may happen in the receive cache also if the receive cache is direct mapped, but if the receive cache is an associative type then the replacing of the block will be governed by a least recently used algorithm. Therefore, it may be preferable to use an associative type cache organization in certain instances. In any event, the system performance will be ensured by the intercache transfer of the block to the receive cache.

The data selection circuit 111 secures an intercache transfer path from the main cache 21 to the receive cache 22. That is, the output of an RCV1 block transfer control circuit 414 (FIG. 6) is fed to an OR circuit 421 (FIG. 6) to cause a G2 control circuit 419 to enable G2ON. The output of an RCV2 block transfer control circuit 415 (FIG. 6) is passed through an OR circuit 423 (FIG. 6) to cause a G3 control circuit 422 (FIG. 6) to enable G3ON.

In the R/W flag circuit 112, a main cache read request circuit 425 (FIG. 7) generates the read signal R3, which causes the main cache 21 to put out a block corresponding to the Address1. The main cache hit check circuit 100 invalidates this block in the main cache for the cache matching control. This ensures that the main cache 21 and the receive cache 22 will not hit at the same time.

Figure 4:
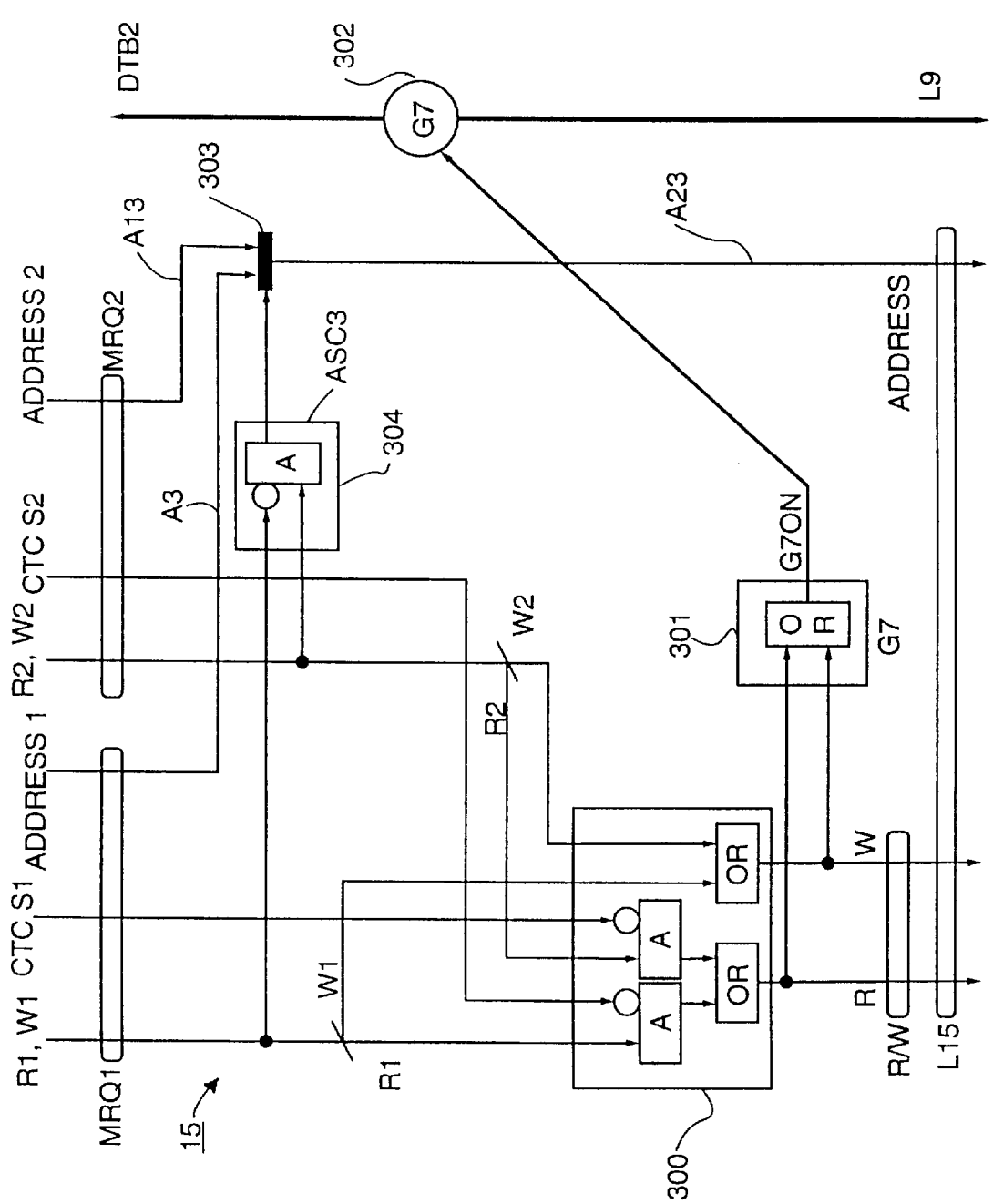
FIG. 4 is a block diagram showing the configuration of a memory access controller in the embodiment.

Next, the CTC generation circuit 113 generates the intercache transfer request signal CTC S1. Then the block read out from the main cache 21 is output to the DTB2. The memory access controller 15 has its memory access limit circuit 300 (FIG. 4) suppress, according to signal CTC S1, the memory read request signal R2 issued from the receive cache controller 14. The receive cache controller 14 receives the block output onto the DTB2 by the main cache controller 13 and writes it into the receive cache 22 through L14. Then, the data latched in 202 is written into the receive cache 22. This is followed by the receive cache hit check circuit 200 registering them in the receive cache.

1.1.2 Main cache: when a miss occurs to the receive cache and the main cache.

When a miss occurs to the main cache 21 (and to the receive cache), the following operation occurs in addition to the operation explained in the foregoing section with respect to the receive cache. The data selection circuit 111 disables all of G1ON, G2ON and G3ON, and the CTC generation circuit 113 also disables CTC S1. In the memory access controller 15, since CTC S1 is disabled and R3 is enabled, the memory access limit circuit 300 (FIG. 4) enables the memory read request signal R. An address selection circuit 304 (ASC3 of FIG. 4) controls a selector 303 (FIG. 4) to output A13 onto A23, which causes the local memory 23 to put out a block corresponding to the Address2. And a G7 control circuit 301 (FIG. 4) enables a gate G7 (302 of FIG. 4) to put this block on DTB2.

The receive cache controller 14 receives the block the memory access controller 15 had placed on the DTB2 and writes the block into the receive cache 22 through L14. The data latched in 202 is written into the receive cache 22. Then, the receive cache hit check circuit 200 registers the data in the receive cache 22.

1.2 Receive cache: when it hits.

To write data latched in 202 into the receive cache 22, the following operation is carried out. In the data selection circuit 211, the G4 control circuit 443 (FIG. 9) supplies the RCV signal to the OR circuit 444 (FIG. 9) to enable G4ON. The G6 control circuit 448 (FIG. 9) enables G6ON. As a result, a path for writing the data into the receive cache 22 is secured. Next, in the R/W flag circuit 212, the receive cache write request circuit 453 (FIG. 10) enables the write signal W4. Then, the data latched in 202 is written into the receive cache 22.

1.3 Receive cache: when there is a replace block.

First, the replace block is written back into the local memory 23. That is, in the memory access request circuit 209, the replace request circuit 431 (RRC2 of FIG. 8) enables the replace block write request signal W2 to the memory access controller 15. The address selection circuit 210 selects a replace address RDADR and controls the selector 214 to output A12 onto A13. Then, the R/W flag circuit 212 enables the receive cache read signal R4 by the replace control circuit 451 (RCC2 in FIG. 10) and the receive cache read request circuit 452 (FIG. 10). In the data selection circuit 211, the G5 control circuit 445 (FIG. 9) enables G5ON and the G6 control circuit 448 (FIG. 9) enables G6ON in order to secure a path for writing the replace block into the local memory 23. Then the replace block is read out from the receive cache 22 onto the DTB2.

In the memory access controller 15, since the write request signal W2 is enabled, the memory access limit circuit 300 (FIG. 4) enables the memory write signal W. Then, the address selection circuit 304 (ASC3 of FIG. 4) controls the selector 303 (FIG. 4) to output A13 onto A23. The G7 control circuit 301 (FIG. 4) turns on G7 to output the replace block, which is on the DTB2, onto L9. As a result, the replace block is written into the local memory 23.

The subsequent operation is the same as that of 1.1 and its explanation is omitted.

2. Memory access from IP 10

There are two kinds of memory access by IP 10—Load and Store. In the succeeding descriptions, the operations associated only with the Load operation are identified by (L) and those with the Store operation are identified by (S). (L) The IP 10 specifies the address CMD=LD to the REQ1. (S) The IP 10 specifies the address CMD=ST to the REQ1 and outputs the data to be stored on DTB1.

The request arbiter 16 selects REQ1 to output REQ1 to REQ4. Then the receive cache controller 14 and the main cache controller 13 perform the hit check for the Address of REQ4. (S) The main cache controller 13 latches in 102 the Store data which was placed on DTB1 by the IP 10.

2.1 Main cache: when it hits.

(L) To supply data from the main cache 21 to the IP 10, the following operation is done. The address selection circuit 110 controls the selector 114 to output A1 to A3. Next, in the R/W flag circuit 112, the main cache read request circuit 425 (FIG. 7) enables the main cache read request signal R3.

The following operation is performed to secure a path for reading the data from the main cache and transferring it to the IP 10. In the data selection circuit 111, the G1 control circuit 417 supplies the output of the LD data transfer control circuit 412 (FIG. 6) to the OR circuit 418 (FIG. 6) to enable G1ON. By sending the LD signal from the decoder 108 to the OR circuit 423 (FIG. 6), the G3 control circuit 422 (FIG. 6) enables G3ON. As a result, the data is read from the main cache 21 onto the DTB1 via L13. The IP 10 receives the data from DTB1, thus completing the Load operation. (S) The address selection circuit 110 controls the selector 114 to output A1 onto A3. Next, in the R/W flag circuit 112 the main cache write request circuit 426 (FIG. 7) enables the main cache write request signal W3.

Then, the following operation is performed to secure a path for writing data into the main cache 21. In the data selection circuit 111, by supplying the ST signal output from the decoder 108 to the OR circuit 418 (FIG. 6), the G1 control circuit 417 (FIG. 6) enables G1ON. Similarly, the G3 control circuit 422 (FIG. 6) supplies the ST signal to the OR circuit 423 (FIG. 6) to enable G3ON. This causes the data latched in 102 to be written into the main cache 21. Then the main cache hit check circuit 100 sets this block as a "dirty block," which does not agree with the local memory 23.

2.2 Main cache: when a miss occurs to the receive cache and the main cache.

When a miss occurs to the main cache 21 (and to the receive cache 22), a block is read from the local memory 23 is registered in the main cache 21 by the following operation. In the memory access request circuit 109, the memory read request circuit 402 (MRRC1 of FIG. 5) enables the memory read request signal R1. The address selection circuit 110 controls the selector 114 to output A1 onto A3.

The next operation is to secure a path to write into the main cache 21 the block read out from the local memory 23. In the data selection circuit 111 the G2 control circuit 419 enables G2ON by supplying the output of the LDST1 block transfer control circuit 420 (FIG. 6) to the OR circuit 421 (FIG. 6). The G3 control circuit 422 enables G3ON by supplying the LD output from the decoder 108 to the OR circuit 423 (FIG. 6). Then, the R/W flag circuit 112 has its main cache write request circuit 426 (FIG. 7) enable the write request signal W3. Once the block has been written to the main cache, the operation is similar to the foregoing when a main cache hit occurs, and is explained as follows with respect to the receive cache.

2.2.1 Receive cache: when a miss occurs to the receive cache and the main cache.

When a miss occurs to the receive cache and the main cache, the receive cache controller 14 disables all of the gates G4ON, G5ON and G6ON. At the same time the CTC generation circuit 213 disables CTC S2. Since in the memory access controller 15, R1 is enabled and CTC S2 is disabled, the memory access limit circuit 300 (FIG. 4) enables the memory read request signal R. The address selection circuit 304 (ASC3 of FIG. 4) controls the selector 303 (FIG. 4) to output A3 to A23. This causes the block to be read from the local memory 23 onto the L9. Then the G7 control circuit 301 (FIG. 4) turns on G7 to put the block on the DTB2. The main cache controller 13 receives the block from the DTB2 and writes it into the main cache 21 via L13. The main cache hit check circuit 100 registers this block in the main cache 21 as a "clean block."

(L) To supply data to the IP 10, the following operation is done. In the data selection circuit 111, the G1 control circuit 417 enables G1ON by passing the output of the LD data transfer control circuit 412 (FIG. 6) onto the OR circuit 418 (FIG. 6) to put the data on the DTB1. The IP 10 takes in the data placed on the DTB1, completing the Load operation.

(S) Next, to write the data, which was latched in 102, into the main cache 21 requires the following operation. In the data selection circuit 111, the G1 control circuit 417 (FIG. 6) enables G1ON by passing the ST signal output from the decoder 108 onto the OR circuit 418 (FIG. 6), causing the data latched in 102 to be written into the main cache 21. Then, the main cache hit check circuit 100 sets this block as a "dirty block."

2.2.2 Receive cache: when it hits.

The receive cache controller 14 reads a block from the receive cache 22. (L) The data is supplied to the IP 10 by an intercache transfer.

The following operation is performed for the intercache transfer from the receive cache 22 to the main cache 21. The address selection circuit 210 controls the selector 214 to output A11 onto A13. (L) In the data selection circuit 211 the G4 control circuit 443 (FIG. 9) enables G4ON by passing the output of the data transfer control circuit 441 (FIG. 9) onto the OR circuit 444 (FIG. 9).

By supplying the output of the LDST2 block transfer control circuit 442 (FIG. 9) to the OR circuit 446 (FIG. 9), the G5 control circuit 445 (FIG. 9) enables G5ON. Then, the G6 control circuit 448 (FIG. 9) enables G6ON. Next, in the R/W flag circuit 212 the receive cache read request circuit 452 (FIG. 10) enables the read signal R4.

The above operation causes the block to be read out from the receive cache 22. (L) Data in the block is supplied to the IP 10 via DTB1. The IP 10 receives the data from the DTB1, thus completing the Load operation.

In the receive cache controller 14, the CTC generation circuit 213 enables the CTC S2 and puts the block on the DTB2 to perform intercache transfer. For the cache match control, this block in the receive cache is invalidated to ensure that the main cache controller 13 and the receive cache controller 14 will not hit at the same time. Since the memory access controller 15 has R1 enabled and CTC S2 enabled, the memory access limit circuit 300 (FIG. 4) suppresses the memory read request.

The main cache controller 13 writes the block, which was placed on the DTB2 by the receive cache controller 14, into the main cache 21 via L13. Because the CTC S2 is enabled, the main cache hit check circuit 100 registers this block as a "dirty block," which does not match the local memory 23. (L) In the data selection circuit 111, since the output of the LD data transfer control circuit 412 is disabled by the CTC S2, the G1 control circuit 417 disables G1ON to turn off G1, doubly blocking the data from being supplied to the IP 10.

(S) The following operation is done to write the data latched in 102 into the main cache 21. In the data selection circuit 111, the G1 control circuit 417 (FIG. 6) enables G1ON by passing the ST signal output from the decoder 108 onto the OR circuit 418 (FIG. 6), causing the data latched in 102 to be written into the main cache 21.

2.3 Main cache: when there is a replace block.

First, the replace block is written back into the local memory 23. In the memory access request circuit 109, the replace request circuit 401 (RRC1 of FIG. 5) enables the replace block write request signal W1 to the memory access controller 15. The address selection circuit 110 selects the replace address RDADR and controls the selector 114 to output A2 onto A3. The R/W flag circuit 112 enables the main cache read request signal R3 by the replace control circuit 424 (RCC1 of FIG. 7) and the main cache read request circuit 425 (FIG. 7). Then the data selection circuit 111 enables the gate G2ON by the G2 control circuit 419 (FIG. 6) and the gate G3ON by the G3 control circuit 422 (FIG. 6), thus securing a path for writing the replace block into the local memory 23. The replace block is then read out from the main cache 21 onto the DTB2.

In the memory access controller 15, since W1 is enabled, the memory access limit circuit 300 (FIG. 4) enables the memory write signal W. The address selection circuit 304 (ASC3 of FIG. 4) controls the selector 303 (FIG. 4) to output A3 onto A23. Then the G7 control circuit 301 (FIG. 4) turns on G7 to output the replace block, which is on the DTB2, to L9. As a result, the replace block is written into the local memory 23 through L15.

The succeeding operation is the same as 2.2 and thus its explanation is omitted.

3. Send request from IP 10

When the IP 10 sends data to other clusters, it specifies a destination cluster number CL#, a send address SADR, a receive address RADR and a send data length LEN in L1 and then starts the sending unit 11. The sending unit 11 first stores in the packet 30 the CL#, RADR and LEN it received from the IP 10 via L1. The sending unit 11 then repeats the following operation until the LEN becomes 0 in order to read the sending data and store it in the packet.

(1) Set CMD=SND and Address=SADR in the REQ2 to make a memory access request.

(2) Set LEN=LEN−1 and SADR=SADR+1.

Upon reading all transfer data, the sending unit 11 puts out the packet 30 on the network 2.

To initiate the send request, REQ2 is selected by the request arbiter 16 and is output to the REQ4. Then the receive cache controller 14 and the main cache controller 13 perform the hit check for the Address of the REQ4. The remainder of the operation is set forth as follows with respect to the elements of the cluster.

3.1 Main cache: when it hits.

As in the case of the Load operation in 2.1, data is supplied from the main cache 21 to DTB1, and the sending unit 11 reads this data. This operation is not detailed further.

3.2 Main cache: when a miss occurs to the receive cache and the main cache.

The main cache controller 13, since the output SND of the decoder 108 is enabled, makes a read request to the local memory. The block thus read, however, is not registered in the main cache 21. This is because there is a possibility that the block the IP 10 references for registration in the main cache may be replaced. When a replace operation occurs, the memory access overhead for the IP 10 increases, deteriorating the performance.

3.2.1 Receive cache: when a miss occurs to the receive cache and the main cache.

First, the address selection circuit 110 controls the selector 114 to output A1 to A3. Then, in the memory access request circuit 109, the memory read request circuit 402 (MRRC1 of FIG. 5) enables the memory read request signal R1 to the memory access controller 15.

The receive cache controller 14 disables all the G4ON, G5ON and G6ON. At this time the CTC2 generation circuit 213 disables the intercache transfer request signal CTC S2.

In the memory access controller 15, since R1 is enabled and CTC S2 is disabled, the memory access limit circuit 300 (FIG. 4) enables the memory read request signal R and the address selection circuit 304 (ASC3 of FIG. 4) controls the selector 303 (FIG. 4) to output A13 onto A23. As a result the block is read out from the local memory 23. Then, the G7 control circuit 301 (FIG. 4) turns on G7 to put this block on the DTB2.

Since CTC S2 is disabled, the main cache controller 13 performs the following operation to secure a path to supply data to the sending unit. In the data selection circuit 111, the output of the SND data transfer control circuit 411 (FIG. 6) is fed to the OR circuit 418 (FIG. 6), causing the G1 control circuit 417 (FIG. 6) to enable G1ON. The output of the SND1 block transfer control circuit 413 (FIG. 6) is fed to the OR circuit 421 to cause the G2 control circuit 419 to enable G2ON. At this time, the SND2 block transfer control circuit 416 (FIG. 6) causes the G3 control circuit 422 (FIG. 6) to disable G3ON to deter the block from being written into the main cache 21. In this way, the block placed on the DTB2 is latched in 202 and the requested data is placed on the DTB1. The sending unit 11 receives data from DTB1 and stores it in the sending FIFO buffer 20 temporarily.

3.2.2 Receive cache: when it hits.

During sending, the intercache transfer from the receive cache 22 to the main cache 21 is not carried out. This is because when a replace operation occurs, the memory access overhead for the IP 10 increases, deteriorating the performance. Further, it is considered that the data to be sent is not likely to be referenced by the IP 10, so there is no advantage to performing the intercache transfer for this reason. Since there is no intercache transfer, the block in the receive cache 22 is not invalidated.

The receive cache controller 14 performs the following operation to supply data to the sending unit 11. That is, address selection circuit 210 controls the selector 214 to output the A11 onto A13. Next, in the R/W flag circuit 212, the receive cache read request circuit 452 (FIG. 10) enables the read request signal R4. Then, a path is secured to transfer data from the receive cache 22 to the sending unit 11. In the data selection circuit 211, by supplying the output of the data transfer control circuit 441 (FIG. 9) to the OR circuit 444, the G4 control circuit 443 (FIG. 9) enables G4ON. The G6 control circuit 448 (FIG. 9) enables G6ON to read from the receive cache 22 and put data on the DTB1. The sending unit 11 receives the data from the DTB1 and stores it in the sending FIFO buffer 20 temporarily.

Figure 11:
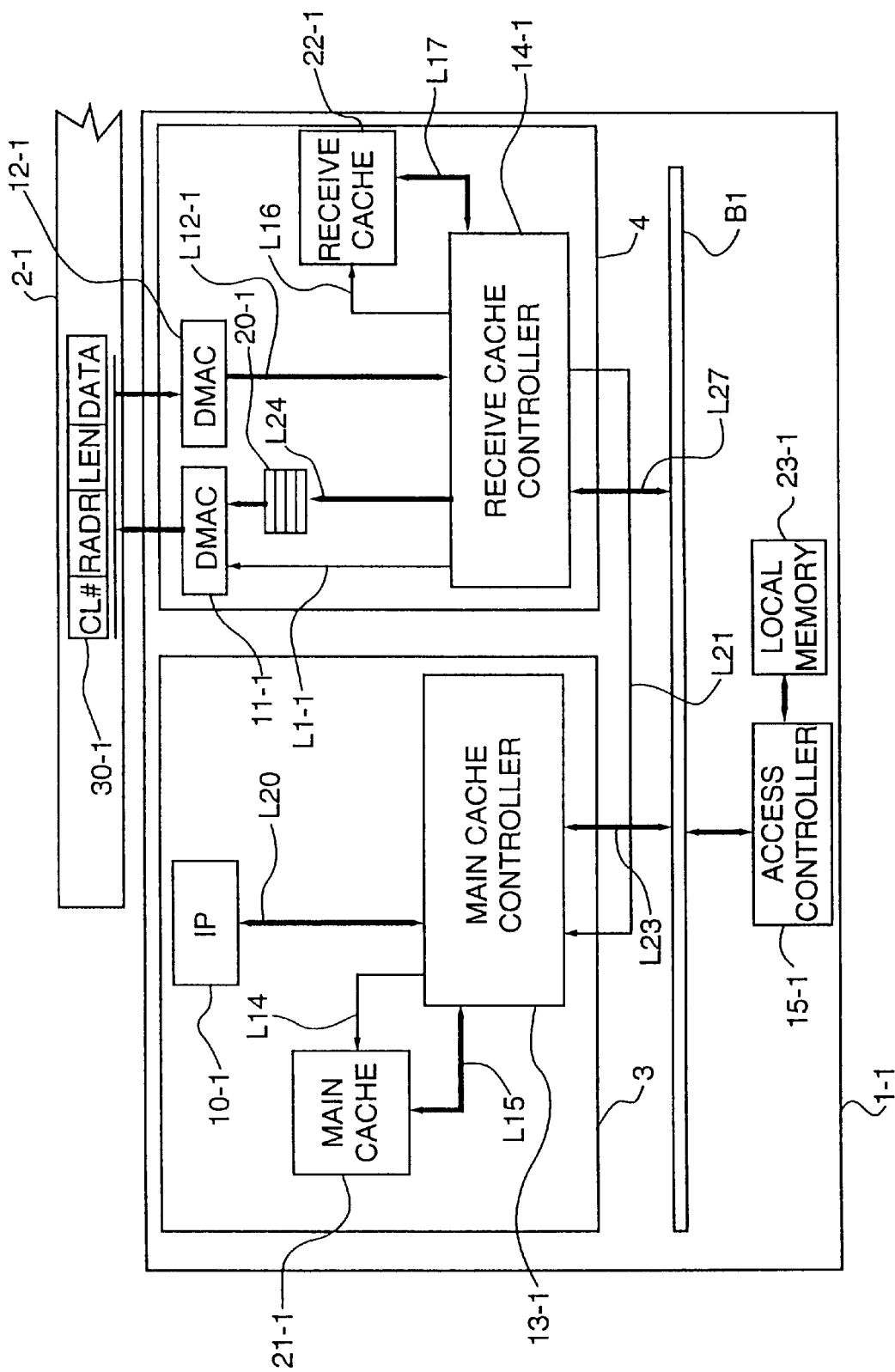
FIG. 11 is a block diagram showing the configuration of a processor or processor element in a multiprocessor system of another embodiment of the invention.

FIG. 11 is a schematic diagram of another embodiment of the invention that shows a cluster 1-1 intended to one of many clusters operating in a multiprocessor system, such as a parallel processor system for example, as with the previous embodiment. Each cluster 1-1, according to this embodiment, has a microprocessing unit 3 and a communications processing unit 4, preferably physically separated from one another and communicating with each other through a common communication bus B1.

Cluster 1-1 functions similarly to the cluster of the previous embodiment with respect to its connection to a network 2-1, however the units 3,4 perform separate functions relating to the receiving and sending of data packets 30-1, which is handled by communications processing unit 3, and executing calculations, which is performed by microprocessing unit 4.

In particular, communications processing unit 4 has sending and receiving units 11, 12, respectively, that perform the network communication functions relating to the sending and receiving of data through the network. Microprocessing unit 4 has an IP 10-1 for executing calculations and fetching data to be sent out on the network. Both units access local memory 23-1, which is connected to communication bus B1 through memory access controller 15.

The receive cache 22-1 in this embodiment is part of the communications processing unit 4 and the main cache 21-1 is part of the microprocessing unit 3, and therefore the caches are separate from one another. Main cache controller 13-1 and receive cache controller 14-1 are provided for the respective caches for controlling their operation.

The operations performed by the cluster 1-1 are handled similarly as with those of the cluster of the first embodiment. In this embodiment, the main cache and receive cache controllers provide the request arbiter function performed by request arbiter 16 of the previous embodiment and also provide the data transfer functions referred to in the following description of the operations that are performed by the cluster 1-1. The details of these control functions are not set forth since they are to be executed in a similar manner as in the previous embodiment.

When a data packet 30-1 is received from the network 2-1, the packet is subjected to processing by the receiving unit 12-1. The data is stored directly in the receive cache 22-1 if there is a receive cache hit. If a miss occurs to the receive cache and the main cache 21-1 hits, then an intercache transfer is executed across communication bus B1.

For the intercache transfer, the block is read from main cache 21-1 by a read request transmitted on line L14 by the main cache controller 13-1. The data is transferred to controller 13-1 via L15 and onto bus B2 via L23. Then, the receive cache controller secures a path for the transfer of the block across L27 from bus B2 and further provides a write request signal to the receive cache over L16 for writing of the data via L17.

If a miss occurs to both caches when data is received, then the block is read from local memory 23-1 by memory access controller 15-1 and transferred to the receive cache controller 14-1 through the bus B1. Then, the block is stored in the receive cache 22-1.

Access of data by IP 10-1 when there is a main cache hit is executed within the microprocessing unit 3 by main cache controller 13-1. In this case the data is transferred from the main cache to the IP 10-1 via L15 and L20. If a miss occurs to the main cache and the receive cache hits, then an intercache transfer is performed in a manner similar to that discussed previously. If a miss occurs to both caches, then the block is read from the local memory and written to the main cache.

For sending data on the network 2-1, the block of data from the receive cache 22-1 (when there is a hit) is transferred to a FIFO buffer 20-1 temporarily and then to the sending unit 11-1. In this case there is no intercache transfer. If there is a hit in the main cache, then the data is sent from the main cache 21-1 to the receive cache controller 14-1 and from there to FIFO buffer 20-1 without registering the data in the receive cache 22-1. Once the data is in the FIFO buffer 20-1, the sending unit 11-1, in response to a control signal sent by the receive cache controller 14-1 via L1-1, puts the data in packet form for transfer on network 2-1.

If the data to be sent is in the local memory, i.e. a miss occurs to both caches, then the data is transferred to the FIFO buffer 20-1 and sent out on the network 2-1 in the same manner without being registered in the main cache 21.

For each embodiment of the invention, a processor or cluster used in an inter processor communication environment, as in a parallel processor system, can put data out on the network directly from the cache memory, if it hits, through a buffer memory of the sending unit, thereby minimizing the data reference overhead of the processor during the sending procedure. Alternatively the data to be sent can be transferred directly to the sending unit's buffer memory and sent out on the network. During the receiving of data from the network, the received data is stored in the receive cache, from which the data is referenced, thus minimizing the received data reference overhead.

We claim:

1. A processor for a multiprocessor system connected to a network, comprising:

an instruction processor for executing instructions;

a local memory for holding instructions to be executed by the instruction processor and data to be processed thereby, and an access controller for controlling access to said local memory;

a main cache for holding part of data held by said local memory and a main cache controller connected to said main cache and instruction processor, and said access controller for controlling said main cache; and a sending unit connected to said main cache for sending data on the network and a receiving unit for receiving data from the network;

a receive cache and a receive cache controller connected to said receive cache, said receive unit and said instruction processor and said access controller for controlling the receive cache so that said receive cache temporarily stores data received by the receiving unit which is to be stored in said local memory;

said main cache controller responding to a memory write request provided by said instruction processor for first data to be written into the local memory, so as to write said write data into said main cache, said main cache controller not writing said received data into said main cache and said receive cache controller not writing said first data requested by said memory write request into said receive cache;

said main cache controller and said receive cache controller both further responding to a common memory read request initiated by said instruction processor unit for second data held in said local memory so as to read the second data requested by the read request from one cache which holds said second data among said main cache and said receive cache; and said main cache controller further responding to a memory read request provided by said sending unit for send data so as to supply the send data from the main cache to the sending unit.

2. A processor according to claim 1, further comprising each of said main cache controller and said receive cache controller having a hit check circuit for determining whether a hit or miss occurs to the main cache and receive cache, respectively, wherein said receive cache controller transfers said received data provided by said receiving unit to said receive cache when a hit to the receive cache occurs with respect to said received data, and when a miss to the receive cache and a hit to the main cache occurs both with respect to said received data, said main cache and receive cache controllers execute an intercache transfer for transferring a hit block in said main cache to said receive cache, and said receive cache controller writes said received data into said transferred block.

3. A processor according to claim 1, wherein said main cache and receive cache controllers have hit check circuits which determine whether a hit or miss occurs to the main cache and receive cache, respectively, and when a miss occurs to both said main cache and said receive cache with respect to said received data, said receive cache controller sends an address of a block to which said received data belongs and a block read request for the block to said access controller for reading of the block held in said local memory, transfers the block read out by said access controller to said receive cache and writes said received data into said read out block.

4. A processor according to claim 1, wherein said instruction processor, said main cache and said main cache controller are part of a microprocessing unit and wherein said sending unit, said receiving unit, said receive cache controller and said receive cache are part of a communication processing unit; and wherein said processor further includes a communication bus connected between said microprocessing unit and said communication processing unit, and wherein said local memory is connected to said communication bus through said access controller.

5. A processor according to claim 4, wherein said communications bus is connected to said main cache controller, said receive cache controller and said access controller for transferring data therebetween.

6. A processor according to claim 1, wherein said sending unit is connected to said main cache controller, said sending unit further comprising means for providing said main cache controller with a memory read request for read out of send data from said local memory; a buffer memory connected to said providing means for holding send data be supplied from said main cache, and packet assembling means for assembling the send data held in said buffer memory into a packet and for sending the packet on the network.

7. A processor according to claim 6, wherein each of said main cache controller and said receive cache controller has a hit check circuit for determining whether a hit or miss occurs to the main cache and receive cache, respectively, wherein said main cache controller and said receive cache controller are both connected to said sending unit, and transfers the send data to said sending unit respectively from said main cache and said receive cache respectively, when a hit to said main cache and a hit to said receive cache occur both with respect to said send data.

8. A processor according to claim 7, wherein when a miss occurs to both the main cache and the receive cache with respect to said send data, said main cache controller fetches the send data from said local memory and transfers said fetched send data to said sending unit, the fetched data being not registered in either the main cache or receive cache.

9. A processor according to claim 1, further comprising a request arbiter for receiving memory read/memory write requests provided from said instruction processor, said sending unit and said receiving unit, for transferring one of said memory read/memory write requests to both of said main cache controller and said receive cache controller;

a hit check circuit for performing parallel hit checks in each of the main and receive caches to determine if data of the request is in one of the main and receive caches.

10. A processor according to claim 1, further comprising a first data bus connecting said instruction processor, said sending unit, said receiving unit, said main cache controller and said receive cache controller for data transfer therebetween; and a second data bus connecting said main cache controller, said receive cache controller and said access controller for data transfer therebetween.

11. A processor according to claim 1, further comprising each of said main cache controller and said receive cache controller having a hit check circuit for determining whether a hit or miss occurs to the main cache and receive cache, respectively, wherein said main cache and said receive cache controllers perform parallel hit checks with respect to said second data as requested by the memory write request provided by the processing unit, in said main cache and in said receive cache with said hit check circuits and when a receive cache hit occurs, said main cache controller and said receive cache controller execute an intercache transfer, so that a hit block within said receive cache is transferred to said main cache.

12. A processor according to claim 11, wherein when said hit check circuits determine that a miss occurs to both said main cache and said receive cache, said access controller fetches a block to which said second data belongs from said local memory to said main cache controller, and said main cache controller registers said fetched block in said main cache.

13. A processor for a parallel processor system having a plurality of processors interconnected by a network, said processor comprising:

a processing unit;

a local memory to store instructions and data;

a sending unit to send data to other processor elements through the network;

a receiving unit to receive data transferred from other processor through the network;

a first cache memory to temporarily store data read out by the processing unit from the local memory or data provided by the processing unit and to be stored in the local memory;

a second cache memory to temporarily store data received by the receiving unit which is to be stored in the local memory;

a cache access control means connected to said processing unit, said first and second cache memories, said receiving unit and said sending unit for controlling read out of data from and writing of data into said first and second cache memories, including;

means responsive to a memory write request provided from the processing unit for write of first data into said local memory, for writing the first data into the first cache memory;

means for writing data received by the receiving unit into the second cache memory;

means responsive to a memory read request provided from the processing unit for read out of second data from said local memory for reading out the second data requested by the memory read request from one of the first and the second cache memories if said one cache memory holds the requested second data and for supplying the read second data to said processing unit; and means responsive to a memory read request provided by the sending unit for read out of send data from the local memory for supplying the send data from said main cache, if the main cache holds the send data.

14. A processor according to claim 13, wherein the cache access control means further includes hit check means responsive to the memory read request for checking in parallel whether the second data requested by the memory read request exists in the first cache memory and in the second cache memory.

15. A processor according to claim 13, wherein the cache access control means further includes:

means for reading from the local memory the second data requested by the memory read request when the second data does not exist in either of the first and second cache memory;

means for writing the read second data into the first cache memory but not into the second cache memory; and means for transfer of the read second data to the processing unit.

16. A processor according to claim 13, wherein the cache access control means further includes:

means for transferring the requested second data from the second cache memory to the first cache memory when the requested second data exists in the second cache memory but not in the first cache memory; and means for invalidating the requested second data present in the second cache memory after the requested second data has been transferred to the first cache memory.

17. A processor according to claim 13, wherein the cache access control means further includes:

means responsive to the memory write request issued by the processing unit for transferring old data designated by the memory write request from the second cache memory to the first cache memory, when the old data exists in the second cache memory but not in the first cache memory;

means for updating the old data transferred to said first cache memory by said first data specified by the memory write request after the old data has been transferred to the first cache memory; and means for invalidating the old data held in the second cache memory after the old data has been transferred to the first cache memory.

18. A processor according to claim 17, wherein the cache access control means further includes:

means for reading the send data requested by the sending unit from said local memory, when that requested send data does not exit in either of the first and second cache memories; and means for transferring the send data read out to the sending unit without writing the send data into any of the first and second cache memories.

19. A processor according to claim 13, wherein the cache access control means further includes:

means responsive to a memory read request issued by the sending unit for read out of send data from said local memory for checking if the send data requested exists in the first memory; and means for transferring the requested send data from the first cache memory to the sending unit, if the first cache memory contains the requested send data.

20. A processor according to claim 19, wherein the cache access control means further includes means for checking whether the send data requested by the sending unit exists in the second cache memory; and means for transferring the send data from the second cache memory to the sending unit, if the second data exists in the second memory.

21. A processor according to claim 13, wherein the first and second cache memories have areas for storing a plurality of blocks contained in the local memory, and the cache access control means further includes:

means responsive to data received by the receiving unit for detecting if a block to which the received data belongs is held in each of the first and the second cache memories; and first means for controlling the writing of the received data into the second cache memory according to the result of detecting.

22. A processor according to claim 21, wherein the cache access control means further includes means for detecting in parallel whether the block to which the received data belongs exists in each of the first and second cache memories.

23. A processor according to claim 21, wherein the first means further includes:

means for writing the received data into the block to which the received data belongs in the second cache memory, when the block exists in the second cache memory;

means for requesting the local memory to read out the block, when the block does not exist in any of the first and second cache memories;

means for writing the block read out into the second cache memory; and means for writing the received data into the block which has been written into the second cache memory.

24. A processor according to claim 23, wherein the first means further includes means for writing back to the local memory a predetermined number of blocks held in the second cache memory before the requesting to the local memory for read out of the block to which the received data belongs, when neither of the first and second cache memories holds the block to which the received data belongs and there are no vacant areas in the first and second cache memories to store the block.

25. A processor according to claim 23, wherein the first means further includes:

means for transferring the block to which the received data belongs to the second cache memory from the first cache memory, when the block does not exist in the second cache memory but exits in the first cache memory;

means for invalidating the block held in the first cache memory; and means for writing the received data into the block transferred in the second cache memory.

26. A processor according to claim 13, wherein the first and second cache memories have areas for storing a plurality of blocks contained in the local memory, and the cache access control means further includes:

means responding to the memory read request provided by said processing unit for detecting if one of the first and the second cache memories holds a block to which the second data requested by the read request belongs;

means for reading the second data requested from the one cache memory, when one of the first and second cache memories holds the block to which the second data belongs;

means for requesting the local memory to read that block, when neither of the first and second cache memories holds the block to which the second data belongs; and means for writing the block which has been read out, into the first cache memory and for transferring the requested second data within the read out block to the processing unit without writing the read out block into the second cache memory.

27. A processor according to claim 26, wherein the cache access control means further includes means which checks in parallel if the block to which the second data requested by the memory read request Provided by the processing unit exists in each of the first and second cache memories.

28. A processor according to claim 26, wherein the cache access control means further includes:

means for transferring the requested data requested by the memory read request from the block to which the second data belongs held in one of the first and second cache memories to the processing unit, when one of the first and second cache memories holds the block to which the requested second data belongs;

means for transferring, when the cache memory containing the block is the second cache memory, the block from the second cache memory to the first cache memory; and means for invalidating the block held in the second cache memory after the transferring of the block has been made.

29. A processor according to claim 26, wherein the cache access control means further includes:

means responsive to a memory read request made by the sending unit for read out of send data from said local memory, for checking if one of the first and second cache memories holds a block to which the requested send data belongs;

means for reading the send data from one of the cache memories containing it and for transferring the read send data to the sending unit, when the one cache memory holds the block to which the send data belongs;

means for requesting the local memory to read that block, when neither of the first and second cache memories holds the block to which the send data belongs; and means for transferring the requested send data within the block to the sending unit without writing the block read out into any of the first and second cache memories.

30. A processor according to claim 29, wherein the cache access control means further includes means for detecting in parallel whether the block to which the send data belongs exists in each of the first and second cache memories.

31. A processor according to claim 29, wherein the means for reading the send data and for transferring the send data includes means for transferring the send data to the sending unit without transferring the block to which the send data belongs from the second cache memory to the first cache memory, when the first cache memory holds the block to which the send data belongs.

32. A processor according to claim 26, wherein the cache access control means further includes:

means responsive to the memory write request made by the processing unit for checking if one of the first and second cache memories holds a block to which the first data requested by said memory write request belongs;

means for requesting the local memory to read out the block to which the first data belongs when neither of the first and second cache memories holds the block to which the first data belongs; and means for writing the block read out from the local memory into the first cache memory.

33. A processor according to claim 32, wherein the cache access control means further includes means for detecting in parallel whether the block to which the first data requested by said memory write request belongs exists in each of the first and second cache memories.

34. A processor according to claim 26, wherein the cache access control means further includes:

means for writing the first data requested by said memory write request provided by said processing unit into the block to which the first data belongs in the first cache memory, when the first cache memory holds the block to which the first data belongs;

means for transferring the block from the second cache memory to the first cache memory, when the second cache memory holds the block to which the first data belongs;

means for writing the first data into the block transferred in the first cache memory; and means for invalidating the block in the second cache memory after the transferring of the block.

35. A multiprocessor system according to claim 13, further comprising:

a plurality of said processors; and a network interconnecting the processors.

* * * * *